No. 769,394. PATENTED SEPT. 6, 1904.
C. MURRAY.
NECK YOKE AND HOLDBACK.
APPLICATION FILED MAR. 12, 1904.
NO MODEL.
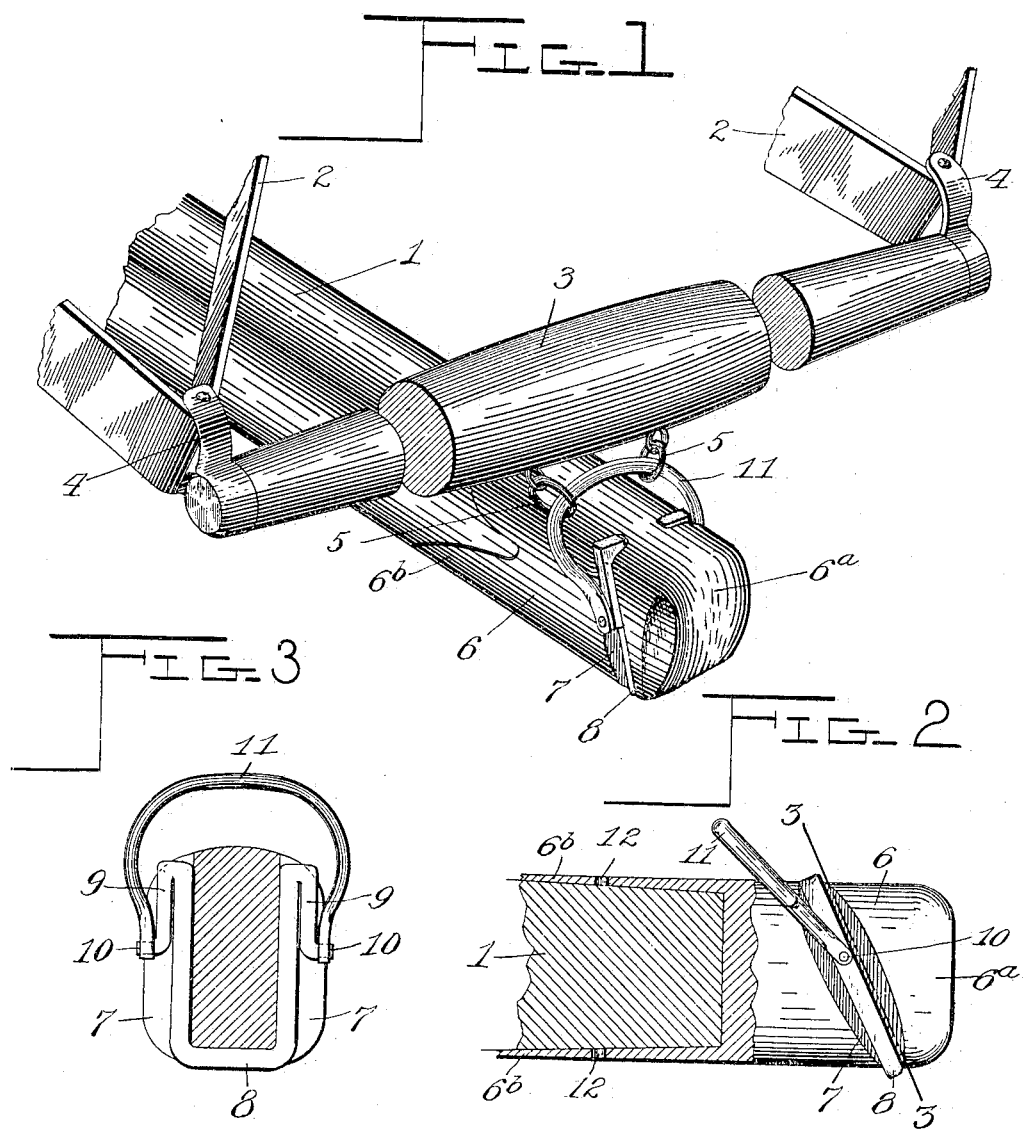
Witnesses:
J. O. Menard
J. H. Gibbs
Charles Murray, Inventor,
By Marion & Marion
Attorneys No. 769,394. Patented September 6, 1904.

UNITED STATES PATENT OFFICE.

CHARLES MURRAY, OF CENTRAL KINGSCLEAR, CANADA, ASSIGNOR OF ONE-HALF TO HARRY H. McNALLY, OF FREDERICTON, NEW BRUNSWICK, CANADA.

NECK-YOKE AND HOLDBACK.

SPECIFICATION forming part of Letters Patent No. 769,394, dated September 6, 1904.

Application filed March 12, 1904. Serial No. 197,785. (No model.)

*To all whom it may concern:*

Be it known that I, CHARLES MURRAY, a subject of the King of Great Britain, residing at Central Kingsclear, county of York, in the Province of New Brunswick, Canada, have invented certain new and useful Improvements in Neck-Yokes and Holdbacks; and I do hereby declare that the following is a full, clear, and exact description of the invention, such as will enable others skilled in the art to which it appertains to make and use the same.

This invention relates to new and useful improvements in neck-yokes and holdbacks and comprises certain features of novelty in the construction and arrangement thereof whereby a simple, economical, and durable device is produced for the purpose intended which may be readily connected with and used upon a pole, such as is commonly used where a team of horses is hitched to a wagon.

The object of the invention is to provide a simple device for the purpose which may be easily applied to carriage-poles as at present found and which may be used in conjunction with an ordinary holdback now common in use.

Referring to the drawings, in which similar numerals of reference indicate corresponding parts in all the views, Figure 1 is a broken perspective view of the end portion of a carriage-pole provided with my improvement with the cross-bar connected in position. Fig. 2 is a side elevation, partly in section, illustrating the manner of connecting my improvement to a carriage-pole; and Fig. 3 is a section taken on the line 3 3 of Fig. 2.

Referring to the parts, 1 is an ordinary carriage-pole.

2 2 are the breast-straps, leading from the collar.

3 is a cross-bar supported from the breast-straps by means of the clips 4.

5 represents the supporting-rings, connected with the cross-bar 3. Secured upon the end of the pole 1 is a socketed member or pole-section 6, which is provided with the obliquely-disposed passage or channel 7, in which is held the approximately U-shaped holdback 8, said holdback being provided with the major portion 8, (best shown in Fig. 3,) the said portion comprising the lower transverse member and the two vertical members shown in that view with the inturned refold member 9, which terminate in pintles 10, projecting laterally therefrom. The holdback thus provided is adapted to rest in the channel 7 in the socketed member 6 and is adapted to support the pole 1 by reason of the bail or hanger 11, extending through the eyes or loops 5 and being connected with the pintles 10 of the holdback 8. When the parts are assembled as shown in Figs. 1, 2, and 3, the weight of the pole, with its appurtenant connections, is carried from the cross-bar 3 through loops 5, bail 11, and holdback 8, to which said bail is pivotally connected, so that the parts form a flexible and very strong connection to the breast-straps 2, which lead to the collars of an ordinary harness. When it is desired to remove the holdback from its connection with the socketed member 6, all that is necessary is to unhook the horses, so as to permit them to advance far enough so that the bail 11 may be carried over the end 6ᵃ of said socketed member 6, so as to free the holdback 8, which will then drop downwardly of the oblique passage 7, provided in the said socketed member, whereby the parts may be disconnected or the pole 1 may be raised out of its engagement with the holdback 8, and thereby release the team from connection with the pole. It is obvious that the socketed member 6, being provided with the rearwardly-extending flanges 6ᵇ, as best shown in Figs. 1 and 2, should be connected with the pole, and perforations 12 are provided therein through which screws may be projected into the pole for connecting the parts together. It is preferred that the seat or socket formed in the member 6 shall be sufficiently large so as to accommodate therein any of the ordinary carriage-poles now in common use, so that little fitting will be required to attach the improved device in position.

While I have shown in the accompanying drawings the preferred form of my invention, it will be understood that I do not limit myself to the precise form shown, for many of the details may be changed in form or position without affecting the operativeness or utility of my invention, and I therefore reserve the right to make all such modifications as are included within the scope of the following claims or of mechanical equivalents to the structures set forth.

Having described my invention, what I claim, and desire to secure by Letters Patent, is—

1. In a device of the character described, a socketed pole connection having obliquely-disposed channels therein, an approximately U-shaped holdback supported in said channels, and connecting means whereby said holdback may be supported.

2. In a device of the character described, a socketed member provided with a seat, an approximately U-shaped holdback in said seat, pintles projecting from said holdback, and a pivotally-connected hanger for supporting the said parts.

3. In a device of the character described, a socketed pole-section having an obliquely-disposed seat therein, a yoke slidable therein, and a connecting-hanger for said yoke pivotally connected therewith.

4. In a device of the character described, a pole-section having an obliquely-disposed seat, an approximately U-shaped yoke therein, pintles projecting laterally from said yoke, and a supporting-bail carried upon said pintles.

5. In a device of the character described, a pole-section having obliquely-disposed seats in opposite sides, a supporting-yoke therein of approximately U shape, and a hanger pivotally connected with said yoke.

6. In a device of the character described, a supporting-yoke comprising an approximately U-shaped member having laterally-projecting pintles, and a pivoted bail or hanger supported on said pintles.

7. In a device of the character described, a combination with a socketed pole-piece having seats therein and a removable approximately U-shaped supporting-yoke, a downturned extension of said yoke, pintles forming the termini of said downturned portions, and a bail or hanger supported on said pintles.

In witness whereof I have hereunto set my hand in the presence of two witnesses.

CHARLES MURRAY.

Witnesses:
BARNETT M. MULLIN,
ROBERT B. VAN DINE.